Patented Apr. 10, 1928.

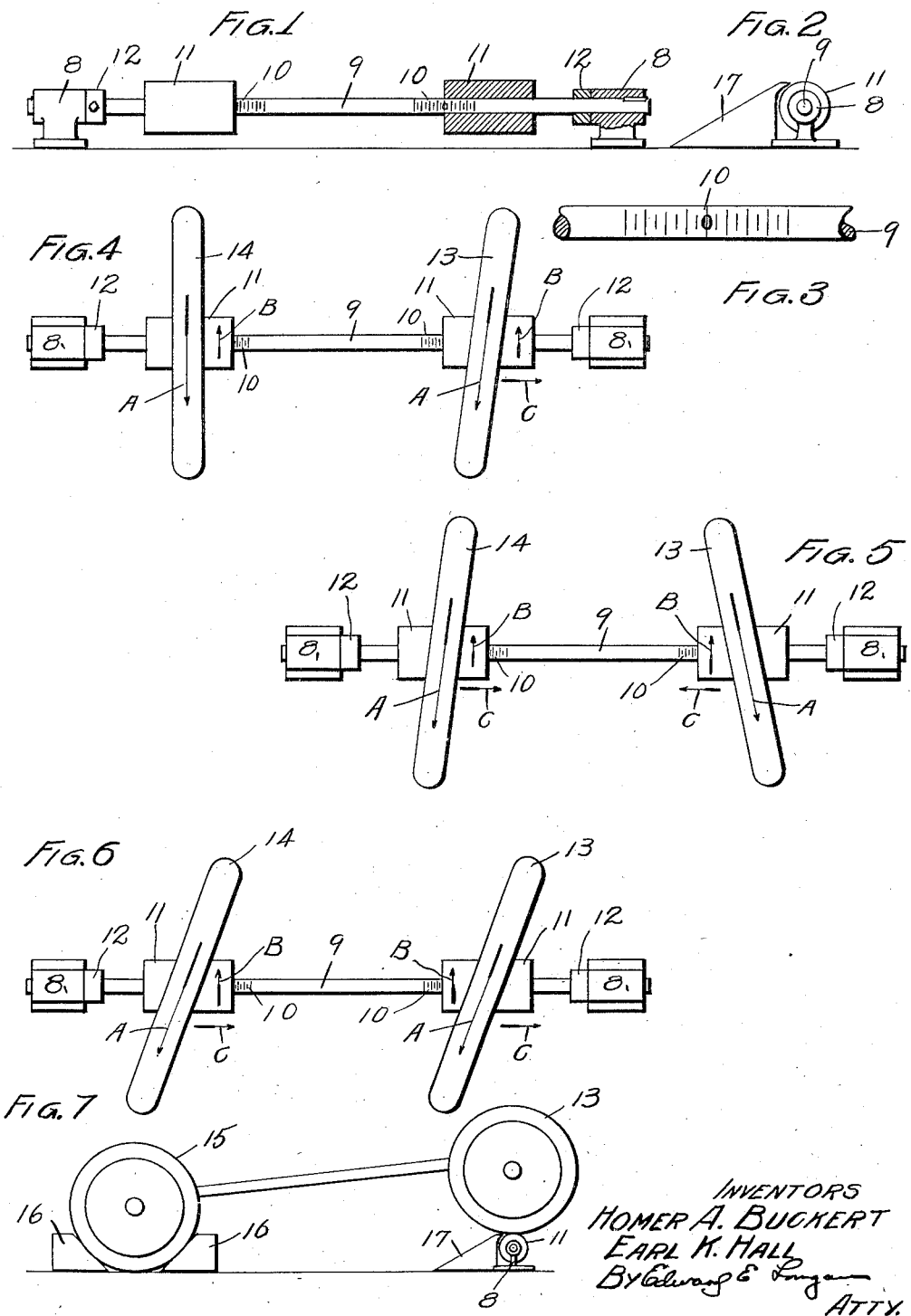

1,665,252

UNITED STATES PATENT OFFICE.

HOMER A. BUCKERT, OF ST. LOUIS, AND EARL K. HALL, OF UNIVERSITY CITY, MISSOURI.

MISALIGNMENT INDICATOR FOR WHEELS.

Application filed June 1, 1926. Serial No. 112,842.

Our invention relates to improvements in misalignment indicators for wheels, and has for its primary object a device which will indicate the misalignment of wheels which has been caused by any means whatsoever, such as accidental bending of the axle or the like, and which causes the wheels to stand at any angle other than the proper angle to the axle.

A further object is to construct a device which will not only indicate that a wheel is in misalignment but will also indicate the amount thereon.

A still further object is to construct a device by means of which at least two wheels mounted on a common axle can be tested simultaneously for alignment and which will indicate misalignment of either one of the wheels, or of both of the wheels and also indicate the extent of such misalignment.

In the drawings:

Fig. 1 is a side view of our device with parts in section;

Fig. 2 is an end view of the same;

Fig. 3 is an enlarged view of a portion of our device illustrating the indicating scale;

Fig. 4 is a diagrammatic view illustrating the operation of our device where one wheel is in misalignment to the other;

Fig. 5 is a diagrammatic view illustrating the operation of the device where both wheels are misaligned in opposite directions;

Fig. 6 is a diagrammatic view illustrating the operation of the device when both wheels are misaligned in the same direction; and Fig. 7 is a diagrammatic view showing the manner of mounting a vehicle suspected of misaligned wheels on our device.

In the construction of our device we employ supports 8 which carry a shaft 9. This shaft is preferably round. The shaft 9 is provided with scales 10. These scales consist of a series of graduations having a central point marked 0, the purpose of which will be explained later. Mounted on the shaft 9 are indicating members 11 which are preferably in the form of cylinders so that they can be revolved as the wheel rotates. In order to prevent any longitudinal movement of the shaft 9 thrust collars 12 are employed. These collars may be either the ordinary set collars or they may be provided with bearing balls as found desirable. The shaft 9 may be rotatably or rigidly mounted in the supports 8.

Referring to the diagrammatic views of Figs. 4 to 6 inclusive, 13 and 14 indicate the wheels to be tested, the arrows A indicating the direction of rotation of the wheels, the arrows B the rotation of the indicating members, and the arrows C the movement of the indicating members. Due to the misalignment of the wheels, the indicating members 11 are preferably supported above the floor and when testing the wheels of a vehicle, we place the inclines 17 adjacent the indicated members 11 so that the wheels can be readily rolled and on to the indicating members. The vehicle is held in position and against accidental creeping by means of blocks 16 as illustrated in Fig. 7 which are placed on each side of the wheels 15 of the vehicle, these being the wheels which are not to be tested.

After moving the wheels of a vehicle into the position indicated in Fig. 7 so that the wheels 13 and 14 will be on the indicating members 11, these members are set so that their inner edges are on the graduation indicated by 0, that being considered the neutral point. The wheels are then revolved either simultaneously or independently in the direction indicated by the arrows A. In Fig. 4 the wheel 13 is in misalignment and when rotated in the direction indicated by the arrow A will rotate the members 11 in the direction of the arrow B, and due to the misalignment of the wheel 13 the indicating member, which supports it, will move longitudinally in the direction of the arrow C while the wheel 14 being in perfect alignment will not move the indicating member on which it rests longitudinally.

In Fig. 5 where both wheels are misaligned, when they are rotated in the direction of the arrow A, the indicating members 11 will rotate in the direction of the arrows B but due to the thrust imparted by this misalignment, they will move longitudinally toward each other and in opposite directions as indicated by the arrows C.

In Fig. 6 where both wheels are misaligned in the same direction and the wheels are rotated in the direction of the arrows A, the indicating members 11 will be rotated in the direction of the arrows B and move longitudinally as indicated by the arrows C. It is to be understood, of coures, that if the wheel 13 in Fig. 4 is misaligned in the opposite direction, the movement of the member 11 longitudinally will be opposite to that illustrated in this figure. In Fig. 5 if the wheels were toed out in the opposite direction, the indicating members 11 instead of moving toward each other would separate. In other words, move in opposite directions while in Fig. 6 if the misalignment of the wheels were in the opposite direction, the movement longitudinally of the indicating members would naturally be opposite to that illustrated. The reason that we have not shown all the various misalignments which might be possible, is to eliminate a multiplicity of drawings, however, from the foregoing description it is believed that the operation of our device will be clearly described.

While we have shown the indicating members as being smooth and as applied to motor vehicles having rubber tires, still it is obvious that our device can be used for indicating the misalignment of wheels especially in pairs which are mounted on the same shaft so that it can be used for railway vehicle purposes, indicating the misalignment of pulleys on shafts, etc., and by reason of the graduations illustrated on the shaft 9, it is possible to determine the exact amount of such misalignment and the direction of the misalignment. That is very essential, especially in motor vehicles where at times the misalignment is very slight so that it will hardly be noticed when viewing the vehicle in operation but still is sufficient to cause a great deal of wear on the tires.

Having fully described our invention, what we claim is:—

1. A misalignment indicator comprising a shaft, a rotatable cylindrical member mounted thereon, said member adapted to have movement in the direction of its axis of rotation on said shaft imparted thereto by the thrust of a misaligned wheel.

2. A misalignment indicator comprising a rotatable member adapted to have sliding movement imparted thereto by the thrust of a misaligned wheel, and a shaft for slidably and rotatably supporting said member, said shaft having graduations thereon for indicating the amount of said sliding movement.

3. A misalignment indicator comprising a pair of elongated rotatable members adapted to have independent sliding movement in the direction of their axes of rotation imparted thereto by the thrust of misaligned wheels, and a shaft for rotatably and slidably supporting said members.

4. A misalignment indicator comprising a pair of rotatable members mounted for independent sliding movement along their axes of rotation, said sliding movement being imparted by the thrust of misaligned wheels, and a support for said members on which they can freely rotate and slide, said support having graduations thereon whereby the amount of sliding movement imparted to said members can be ascertained.

5. A misalignment indicator comprising an elongated member, a support therefor on which said member is free to rotate and to move longitudinally by the thrust of a misaligned wheel, the support having graduations thereon for indicating the amount of and the direction of said thrust whereby the misalignment can be ascertained.

6. A misalignment indicator comprising a pair of rotatable members adapted to have movement in the direction of their axes of rotation, said movement being imparted thereto by the thrust of misaligned wheels, and a cylindrical support for said members, there being graduations on the support for indicating the amount of and the direction of the thrust whereby the misalignment of wheels can be ascertained.

In testimony whereof we have affixed our signatures.

HOMER A. BUCKERT.
EARL K. HALL.